United States Patent
Abraham

(10) Patent No.: US 12,044,312 B2
(45) Date of Patent: Jul. 23, 2024

(54) PISTON FOR AN INTERNAL COMBUSTION ENGINE

(71) Applicant: Caterpillar Motoren GmbH & Co. KG, Kiel (DE)

(72) Inventor: Volker Abraham, Kiel (DE)

(73) Assignee: Caterpillar Motoren GmbH & Co. KG, Kiel (DE)

(*) Notice: Subject to any disclaimer, the term of this patent is extended or adjusted under 35 U.S.C. 154(b) by 41 days.

(21) Appl. No.: 17/789,273

(22) PCT Filed: Dec. 16, 2020

(86) PCT No.: PCT/EP2020/025585
§ 371 (c)(1),
(2) Date: Jun. 27, 2022

(87) PCT Pub. No.: WO2021/129952
PCT Pub. Date: Jul. 1, 2021

(65) Prior Publication Data
US 2023/0067611 A1    Mar. 2, 2023

(30) Foreign Application Priority Data

Dec. 27, 2019 (GB) ..................... 1919377

(51) Int. Cl.
*F16J 1/08* (2006.01)
*F02F 3/00* (2006.01)
*F02F 3/22* (2006.01)

(52) U.S. Cl.
CPC ............ *F16J 1/08* (2013.01); *F02F 3/0069* (2013.01); *F02F 3/22* (2013.01)

(58) Field of Classification Search
CPC ....... F02F 3/22; F02F 3/225; F16J 1/04; F16J 1/08
See application file for complete search history.

(56) References Cited

U.S. PATENT DOCUMENTS

| 2,380,907 A | 7/1945 | Hall |
| 4,987,866 A * | 1/1991 | Mielke ................. F02F 3/025 92/236 |

(Continued)

FOREIGN PATENT DOCUMENTS

| CN | 202381187 U | 8/2012 |
| CN | 202867016 U | 4/2013 |

(Continued)

OTHER PUBLICATIONS

KR102159566B1_t machine translation thereof (Year: 2020).*

(Continued)

*Primary Examiner* — Kenneth Bomberg
*Assistant Examiner* — Matthew Wiblin

(57) ABSTRACT

The present invention refers to a piston for an internal combustion engine, particularly a V-engine. The piston comprises an oil drainage groove provided in the outer circumferential surface of the piston between a ring belt and a piston skirt of the piston, the piston skirt being provided with two recessed pin boss portions on opposed sides of the piston, wherein the piston skirt is further provided with at least one oil drainage duct arranged between the two recessed pin boss portions at an outer surface of the piston skirt and configured to fluid-communicatively connect the oil drainage groove with the recessed pin boss portions.

14 Claims, 5 Drawing Sheets

(56) References Cited

U.S. PATENT DOCUMENTS

| | | | | |
|---|---|---|---|---|
| 5,435,872 A * | 7/1995 | Penrice | ...................... | F16J 1/08 |
| | | | | 123/193.6 |
| 6,026,777 A | 2/2000 | Kemnitz et al. | | |
| 6,557,514 B1 | 5/2003 | Gaiser | | |
| 6,840,155 B2 | 1/2005 | Ribeiro et al. | | |
| 7,614,339 B2 * | 11/2009 | Fisher | ...................... | F01M 9/00 |
| | | | | 92/159 |
| 8,042,453 B2 | 10/2011 | Azevedo | | |
| 8,807,109 B2 | 8/2014 | Muscas et al. | | |
| 2002/0046593 A1 * | 4/2002 | Ribeiro | ................ | F02F 3/0023 |
| | | | | 29/888.09 |
| 2004/0237775 A1 | 12/2004 | Dunaevsky et al. | | |
| 2004/0262297 A1 | 12/2004 | Ribeiro et al. | | |
| 2005/0092739 A1 | 5/2005 | Ribeiro et al. | | |

FOREIGN PATENT DOCUMENTS

| | | | | |
|---|---|---|---|---|
| CN | 202991255 U | 6/2013 | | |
| CN | 203499840 U | 3/2014 | | |
| CN | 209115215 U | 7/2019 | | |
| GB | 481347 A | 3/1938 | | |
| JP | H11351055 | 12/1999 | | |
| JP | 2005520082 | 7/2005 | | |
| JP | 2007524512 | 8/2007 | | |
| KR | 102159566 B1 * | 9/2020 | ................ | F16J 1/08 |
| WO | 2006072293 A1 | 7/2006 | | |

OTHER PUBLICATIONS

International Search Report related to Application No. PCT/EP2020/025585; reported on Apr. 1, 2021.

Great Britain Search Report related to Application No. 1919377.0; reported on Apr. 29, 2020.

* cited by examiner

PISTON FOR AN INTERNAL COMBUSTION ENGINE

CROSS-REFERENCE TO RELATED APPLICATION

This Application is a 35 USC § 371 US National Stage filing of International Application No. PCT/EP2020/025585 filed on Dec. 16, 2020 which claims priority under the Paris Convention to Great Britain Patent Application No. 1919377.0 filed on Dec. 27, 2019.

Technical Field

The present invention refers to a piston for use in an internal combustion engine, and an internal combustion engine, in particular a V-engine, which is equipped with at least one such piston.

Technological Background

In internal combustion engines, such as diesel engines, it is known to employ pistons with a structural configuration comprising a piston head and a piston skirt. The piston head includes an outer ring belt at a circumferential outer surface thereof which forms a plurality of circumferentially continuous ring grooves for accommodating corresponding piston rings that ride against an inner wall of a cylinder of the engine in which the piston reciprocatingly moves during operation.

The piston rings have the function of sealing the combustion chamber from a crank case of the engine. Further the piston rings are intended and configured to maintain a proper quantity of oil between the piston and the cylinder wall and to regulate engine oil consumption by scrapping oil from the cylinder walls back to an oil sump accommodated in the crank case.

For doing so, the lowest of the ring grooves, i.e. which is arranged closest to the piston skirt, typically accommodates a so-called oil scrapper ring configured for scrapping oil from the cylinder wall so as to limit and regulate the amount of oil being passed to the further piston rings. In this way, the scrapper ring aims on minimizing so-called "blow-by" effects according to which oil passes by the piston rings and thus slides into the combustion chamber. This unintended discharge of oil into the combustion chamber is generally also referred to as "oil slide" and may lead to a reduced engine performance, a reduced engine component life and undesirable hydrocarbon emissions of the engine.

Specifically, the oil scrapper ring is designed such that, during the downstroke of the piston, the oil scrapped from the cylinder wall is built up ahead thereof. Thus, for ensuring proper function of the oil scrapper ring, the oil built up ahead of the rings needs to be adequately drained so as to ensure that a sufficient amount of oil can be scrapped from the cylinder wall. Accordingly, known piston configurations are provided with an oil drainage path designed for guiding and thereby returning oil built up ahead of the ring belt back into the crank case during downstroke movement of the piston.

In one known piston configuration, the lowest ring groove accommodating the oil scrapper ring is connected to a limited number of oil drainage holes provided in the piston skirt and configured to guide oil built up in the lowest ring groove into an inside of the piston skirt. Then, from the inside of the piston skirt, the oil flows back into the crank case via an open bottom of the piston skirt.

Further, piston configurations are known, e.g. from U.S. Pat. No. 6,557,514 B1, in which oil built up ahead the ring belt during downstroke movement of the piston is received in a circumferential oil drainage groove arranged adjacent to the lowest piston ring groove and thereafter is guided across an outer surface of the piston skirt so as to be drained into the crank case. Specifically, the piston skirt, at opposing sides, is provided with recessed pin bosses which open into the oil drainage groove. By such a configuration, the oil received in the oil drainage groove is guided across an outer surface of the recessed pin bosses to drain downwardly back into the crankcase.

However, when applying the known piston configurations in V-engines, the angulation of the pistons may affect the flow of oil across or through the piston skirt. In this way, the oil to be drained may be subjected to an increased flow resistance upon flowing through the oil return path formed by the piston, e.g. which may be caused by splashing of the oil or deflecting the oil upwards against gravity. As a result, a sufficiently high oil return flow rate from the ring belt into the piston skirt may not be ensured which may cause oil slide into the combustion chamber during operation.

SUMMARY OF THE INVENTION

Starting from the prior art, it is an objective to provide an improved piston for an internal combustion engine which effectively prevents oil slide into a combustion chamber of the engine, particularly when being applied in V-engines. To that end, it is an objective to provide an internal combustion engine, in particular a V-engine, which is equipped with at least one such piston.

These objectives are solved by the subject-matter of the independent claims. Preferred embodiments are set forth in the present specification, the Figures as well as the dependent claims.

Accordingly, a piston for an internal combustion engine, particularly a V-engine, is provided which comprises an oil drainage groove provided in the outer circumferential surface of the piston between a ring belt and a piston skirt of the piston. The piston skirt is provided with two recessed pin boss portions on opposed sides of the piston and with at least one oil drainage duct arranged between the two recessed pin boss portions at an outer surface of the piston skirt. The oil drainage duct is configured to fluid-communicatively connect the oil drainage groove with the recessed pin boss portions.

Furthermore, an internal combustion engine, particularly a V-engine, is provided which is equipped with at least one above-described piston.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
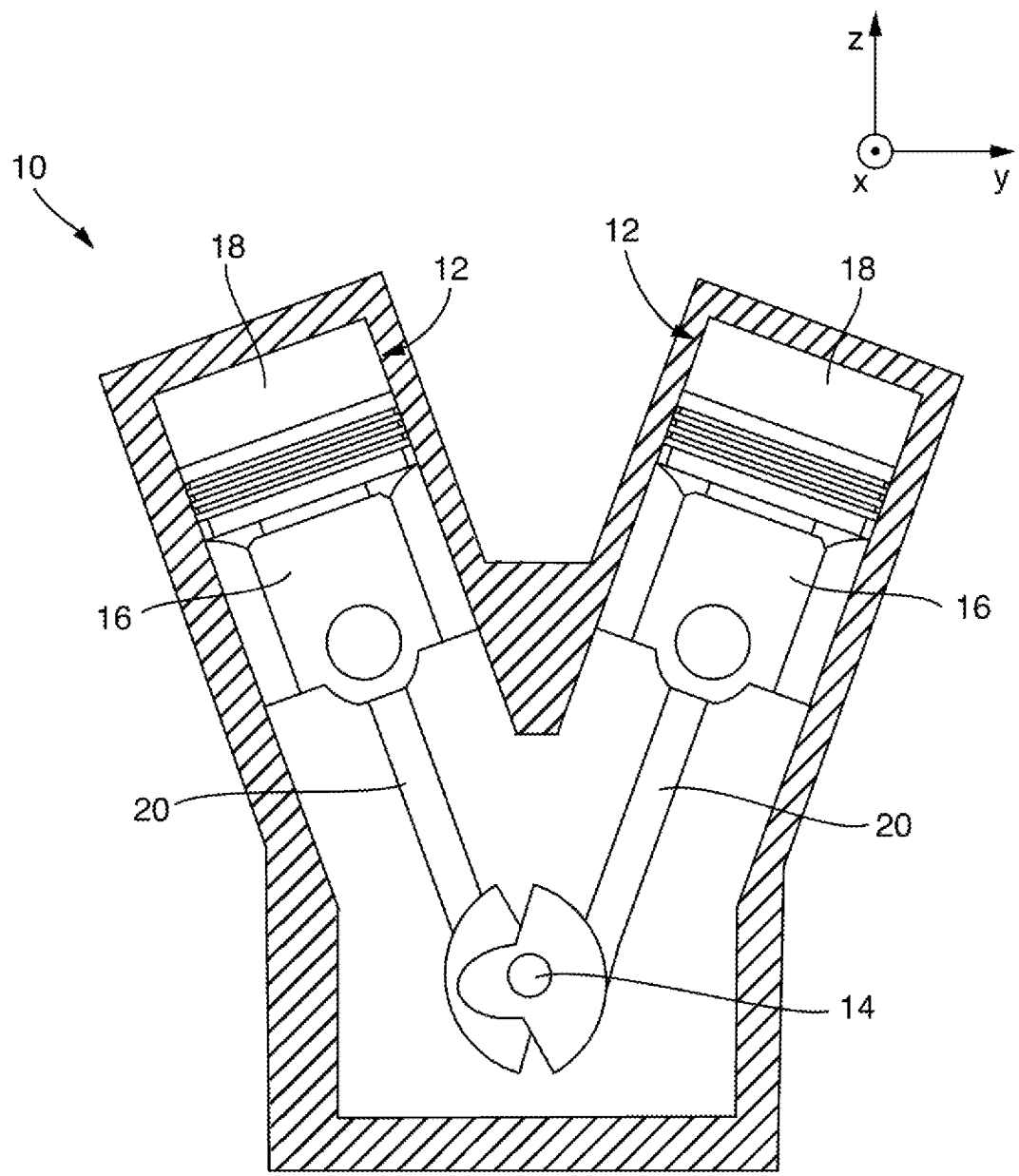
FIG. 1 shows a schematic cross-section of an internal combustion engine.

In the following, the invention will be explained in more detail with reference to the accompanying Figures. In the Figures, like elements are denoted by identical reference numerals and repeated description thereof may be omitted in order to avoid redundancies.

FIG. 1 schematically shows an internal combustion engine 10, also referred to as "engine" in the following, which can be installed in a vehicle, such as a vessel or a construction vehicle, as a main or auxiliary engine. In the shown configuration, the engine 10 is provided in the form of a V-engine comprising a plurality of cylinders 12, e.g. eight, twelve or eighteen cylinders, arranged in a V-configuration. Specifically, as can be gathered from FIG. 1, the cylinders 12 are arranged in two lines parallel to a crankshaft 14 of the engine 10. Each line of cylinders 12 is also referred to as a cylinder bank. The angle between the cylinder banks, also referred to as "bank angle", is 40° in the shown configuration, but is not limited thereto. Rather, the engine 10 may be provided with any suitable bank angle, for example a bank angle between 20° and 120°, specifically 50°.

Each cylinder 12 accommodates a piston 16 having a head portion which delimits a combustion chamber 18 within the cylinder 12. Specifically, the piston 16 is configured for reciprocating and axial movement within the cylinder 12 and is connected to the crankshaft 14 of the engine 10 via a connecting rod 20.

The engine 10 further comprises a control device (not shown) which controls actuation of an intake system (not shown) for selectively supplying an air-fuel-mixture into the combustion chamber 18, an ignition system (not shown) for selectively igniting the air-fuel mixture received in the combustion chamber 18, and an expelling system (not shown) for selectively expelling combustion gases from the combustion chamber 18.

By such a configuration, i.e. upon igniting the air-fuel mixture in the combustion chamber 18, high-temperature and high-pressure gases are produced in the combustion chamber 18 which apply forces to and thus axially move the piston 16, thereby rotating the crankshaft 18. In this way, chemical energy is transformed into mechanical energy.

The basic structure and mode of operation of the engine 10 and its components are well known to a person skilled in the art and are thus not further specified. Rather, characteristics of the piston 16 employed in the engine 10 which are interlinked with the present invention are addressed in the following.

Figure 2:
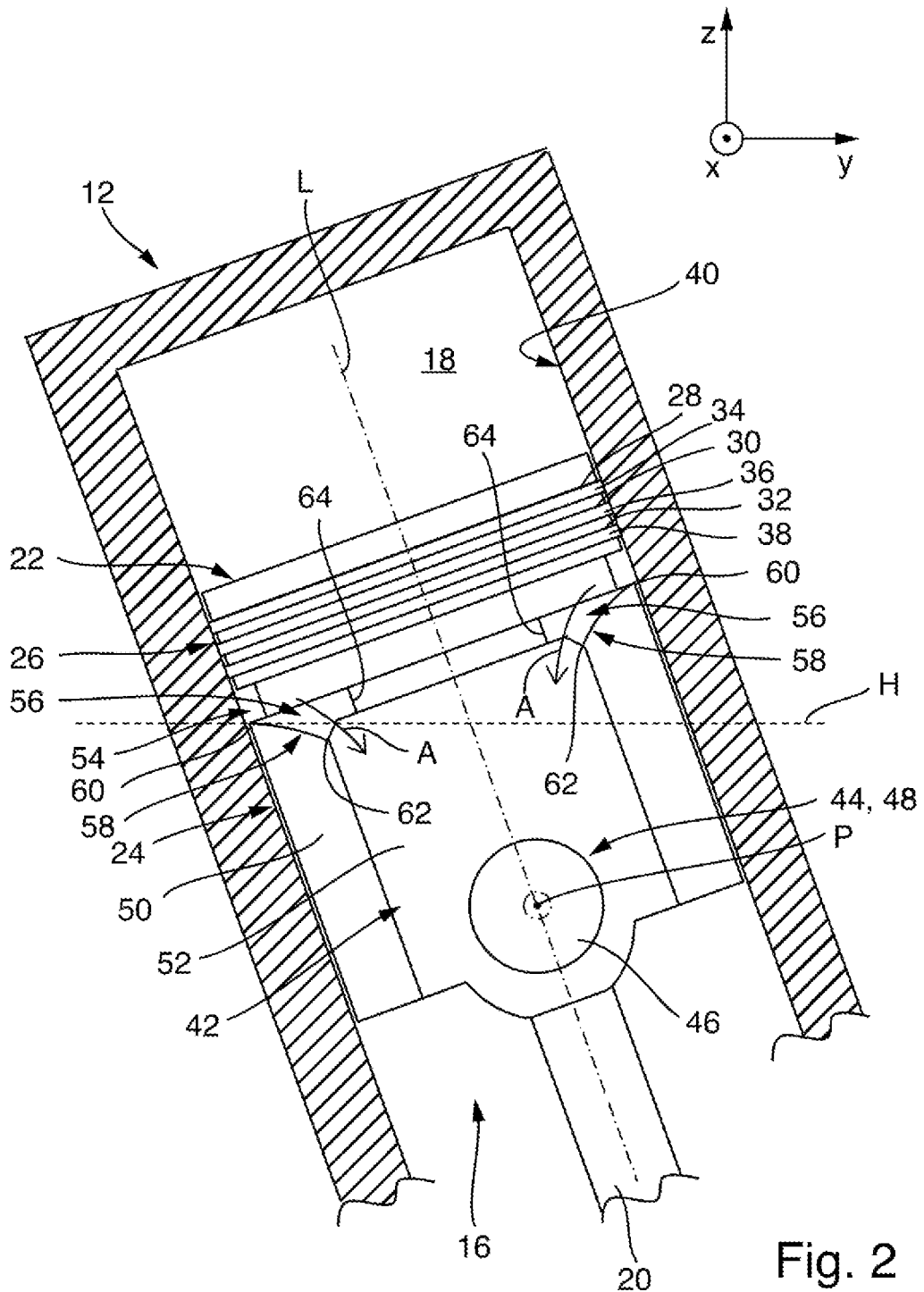
FIG. 2 shows an enlarged view of the internal combustion engine depicted in FIG. 1.
Figure 3:
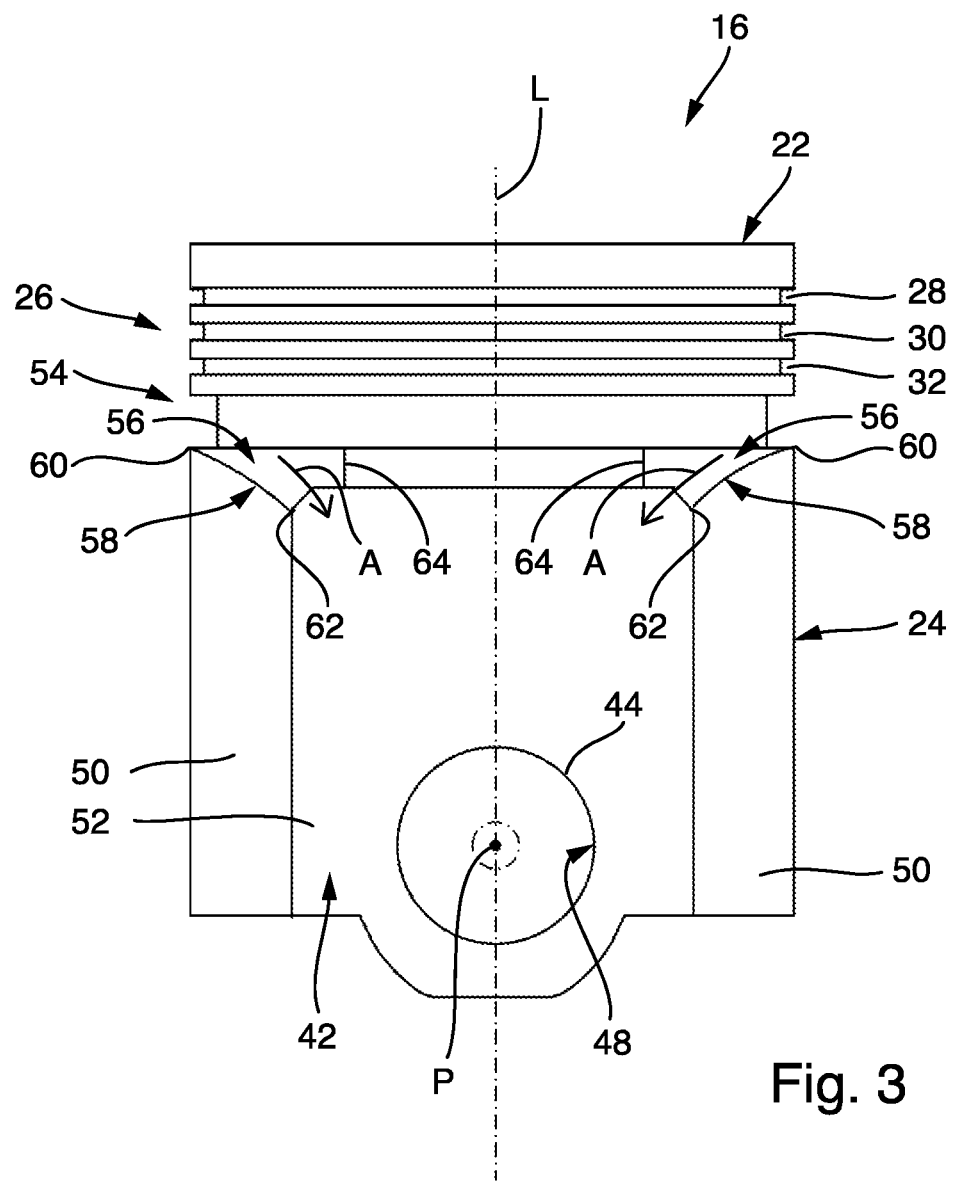
FIG. 3 shows a schematic front view of a piston employed in the engine depicted in FIGS. 1 and 2.
Figure 4:
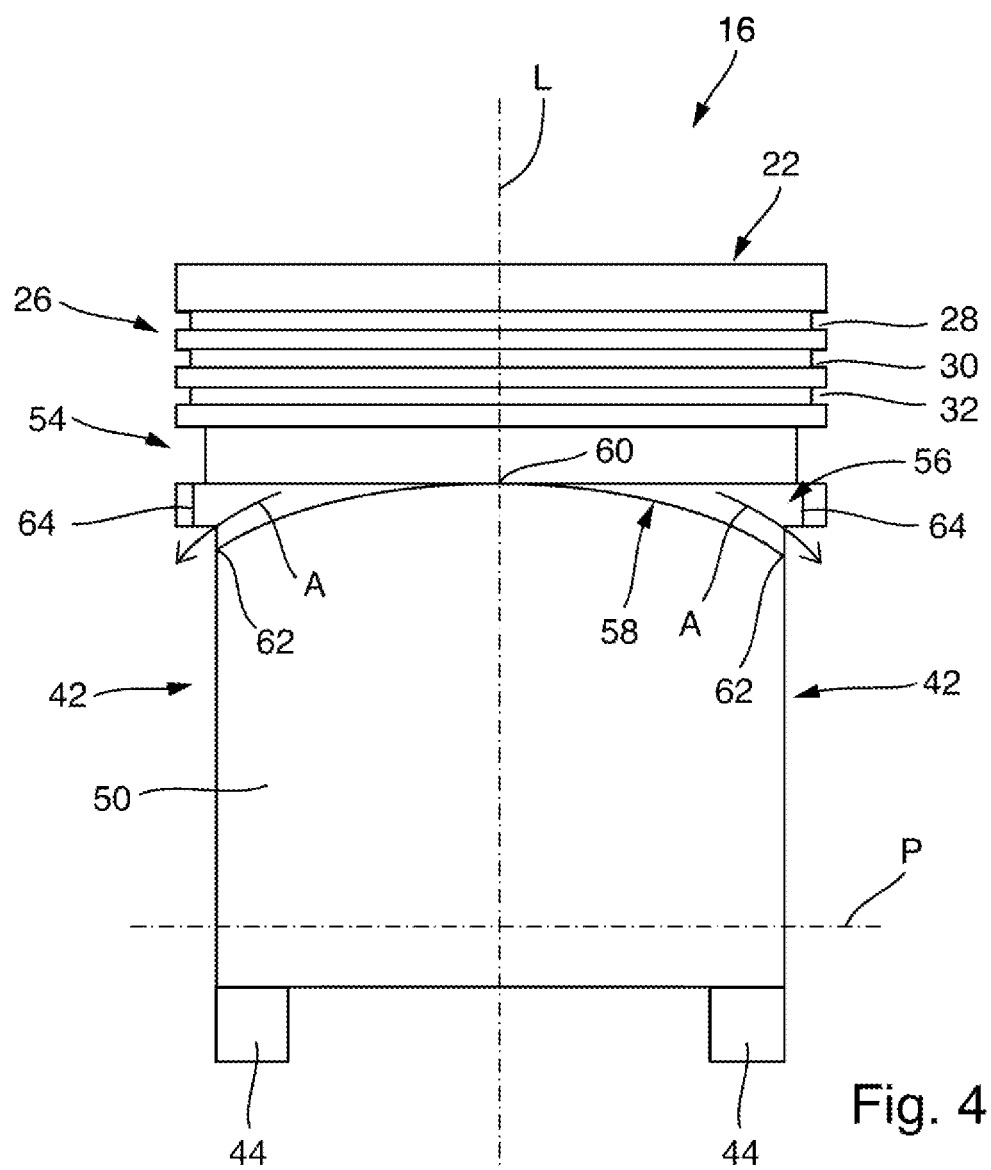
FIG. 4 shows a schematic side view of the piston depicted in FIG. 3.

FIG. 2 shows an enlarged view of the piston 16 in a mounted state, i.e. in which it is mounted in the cylinder 12 of the engine 10. To that end, FIGS. 3 and 4 show the piston 16 depicted in FIGS. 1 and 2 in an unmounted state, i.e. in which it is disassembled from the engine 10.

The piston 16 preferably has a multi-part design, for example a two-part design, in which a piston head 22 and a piston skirt 24 constitute distinct parts of the piston 16. Alternatively, the piston 16 may be provided with an integral design, also referred to as monobloc construction or monobloc piston, in which the piston 16 is cast of a single piece.

The piston head 22, at a circumferential outer surface thereof, is provided with a cylindrical ring belt 26 which is arranged spaced apart from a front face of the piston head 22 delimiting the combustion chamber 18 of the cylinder 12. The ring belt 26 is formed with a plurality of piston ring grooves 28, 30, 32 provided at an outer surface of the ring belt 26, each of which, as can be gathered in FIG. 2, is designed for accommodating a piston ring 34, 36 and 38, also referred to as oil control rings. Specifically, the piston rings 34-38 are configured to seal the combustion chamber 18 from a crank case of the engine 10 and, at the same time, to maintain a proper quantity of oil between the piston 16 and the cylinder wall 40 during operation of the engine 10. To that end, the piston rings 34-88 limit and regulate an engine oil consumption by scrapping oil from the cylinder wall 40 back to an oil sump accommodated in the crank case as will be set forth below.

Specifically, for doing so, the lowest piston ring 38, i.e. accommodated in the lowest ring groove 32, is provided in the form of a so-called oil scrapper ring. By such a configuration, the piston ring 38 accommodated in the lowest ring groove 32 is configured for scrapping oil from a cylinder wall 40 upon a downstroke movement of the piston 16 within the cylinder 12.

In the context of the present disclosure, the term "lowest piston ring" 38 refers to that one of the plurality of piston rings 34-38 which is arranged closest to the piston skirt 24.

The piston head 22 is further equipped with an internal cooling galley (not shown) in which cooling oil is circulated to cool the piston 16, i.e. its head portion, during operation. The basic structure and operation of such an internal cooling galley is well known to the skilled person and is thus not further specified.

The piston skirt 24 comprises two recessed pin boss portions 42 which are arranged on opposed sides of the piston skirt 24. In other words, the pin boss portions 42 are arranged opposed to each other with respect to a longitudinal axis L of the piston 16.

In the context of the present disclosure, the term "longitudinal axis" L refers to an axis of the piston 16 which is parallel to a direction of the reciprocating movement of the piston within the cylinder 12.

Each of the recessed pin boss portions 42 is provided with a pin boss 44 in which a wrist pin 46 is received for pivotably coupling the piston 16 to the connecting rod 20. By such a configuration, the wrist pin 46 extends through an inside of the piston skirt 24 and is coupled to pin bores 48 formed in the pin bosses 44. Accordingly, the pin bores 48 are aligned along a pin bore axis P of the piston.

In the context of the present disclosure, the term "pin bore axis" P refers to an axis of the piston 16 which is perpendicular to the longitudinal axis L of the piston 16 and parallel to a longitudinal axis of the wrist pin 46.

In the shown configuration, the recessed pin boss portions 42 are arranged adjacent to cylindrical portions 50 of the piston skirt 24. The recessed pin boss portions 42 together with the cylindrical portions 50 constitute a shell surface, i.e. an outer surface, of the piston skirt 24.

More specifically, the piston skirt 24 is provided such that, in a mounted state of the piston 16, an outer face of the cylindrical portions 50 of the piston skirt 24 is arranged adjacent to and substantially follow the shape of the cylinder wall 40, wherein an outer face 52 of the recessed pin boss portions 42 is spaced apart from the cylinder wall 40. In other words, in the region of the pin boss portions 42, a part of the shell surface of the piston skirt 24 is intendedly recessed compared to a cylindrical shell surface, while the other part of the piston skirt's shell surface formed by the cylindrical portions 50 is designed to substantially follow the cylindrical shell surface. In this way, when being received within the cylinder 12, a gap is formed between the recessed pin boss portions 42 and the cylinder wall 40, i.e. in a radial direction, which is substantially greater compared to a gap formed between the cylindrical part 50 of the piston skirt 24 and the cylinder wall 40.

Figure 5:
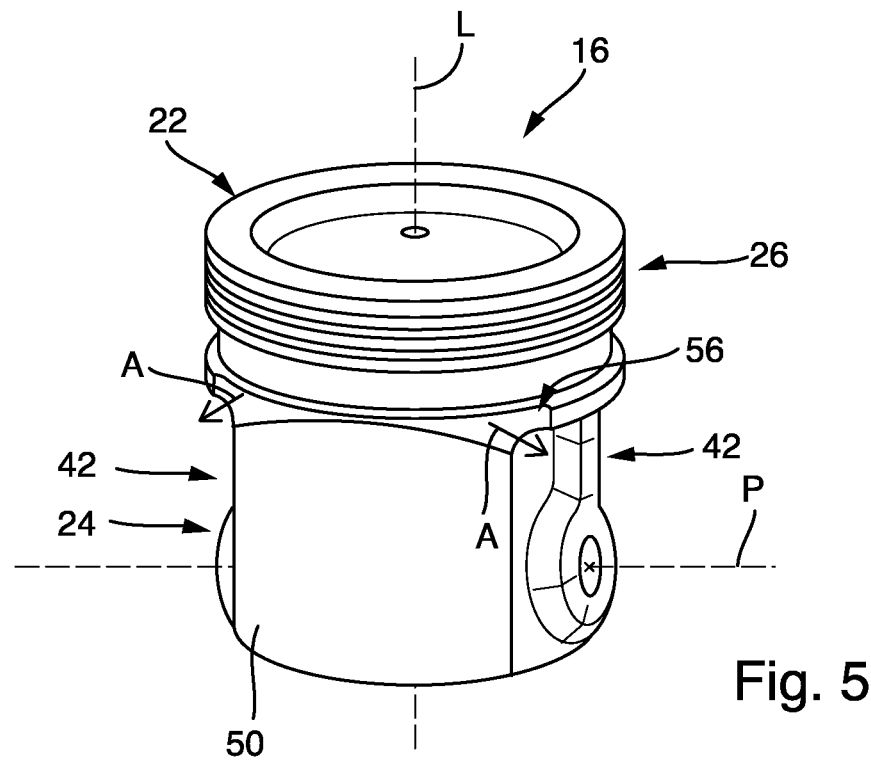
FIG. 5 shows a schematic perspective view of a piston according to another configuration.
Figure 6:
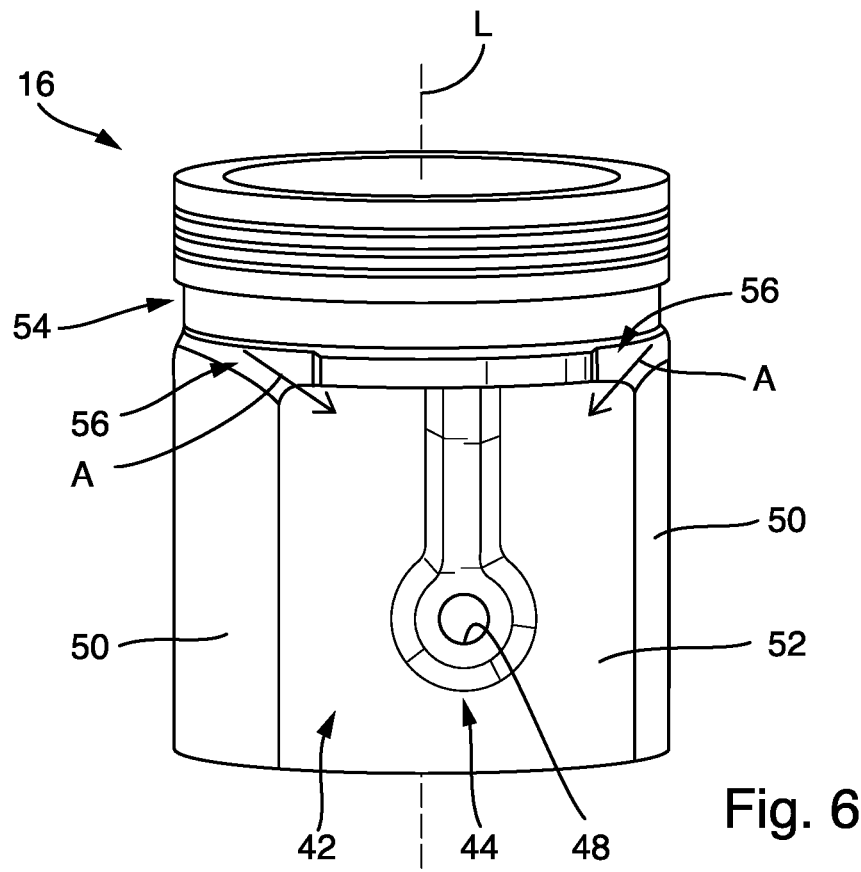
FIG. 6 shows a further schematic perspective view of the piston depicted in FIG. 5.

In the configuration of the piston 16 depicted in FIGS. 1 to 4, the outer face 52 of the recessed pin boss portions 42, which form an outer surface of the piston 16, have a planar shape. Alternatively, the outer face 52, particularly in a region around the pin bores 48, may be provided with a plurality of recesses extending in a radial inward direction as shown in the further configuration of the piston 16 depicted in FIGS. 5 and 6.

Further, the piston 16 comprises an oil drainage groove 54 provided in the outer circumferential surface of the piston between the ring belt 26 and the piston skirt 24 of the piston 16. In the shown configuration, the oil drainage groove 54 constitutes a circumferential continuous ring groove in the outer surface, i.e. a shell surface, of the piston 24. The oil drainage groove 54 separates the piston head 22 and the piston skirt 24 from one another. In other words, in a downward or downstroke movement direction of the piston 26, i.e. along the longitudinal axis L, the ring belt 26, the oil drainage groove 54 and the piston skirt 24 are successively arranged, i.e. one after the other.

In the context of the present disclosure, the term "downward or downstroke movement direction" of the piston 16 refers to a movement direction of the piston 16 along its longitudinal axis L which, in the mounted state of the piston 16, faces the crank shaft 14 or crankcase of the engine 10.

The oil drainage groove 54 is configured to receive and collect oil which is built up ahead or in front of the ring belt 26 during operation of the piston 16. As to substance, as set forth above, the lowest piston ring 38 accommodated in the lowest ring groove 32 is configured for scrapping oil from the cylinder wall 40 upon downstroke movement of the piston 16 within the cylinder 12. In other words, upon axially moving the piston 16 within the cylinder 12 downwardly, i.e. in the downstroke movement direction, the lowest ring groove 32 scraps oil from the cylinder wall 40 which is then received in the oil drainage groove 54.

Further, the piston 16 comprises two oil drainage ducts 56 designed and configured for draining the oil collected in the oil drainage groove 54 into the crank case. Specifically, the piston skirt 24 is provided with the oil drainage ducts 56 at an outer surface thereof such that each one of the oil drainage ducts 56 is arranged between the recessed pin boss portions 42. In other words, in a circumferential direction of the piston 16, i.e. around its longitudinal axis L, each one of the oil drainage ducts 56 is arranged between the recessed pin boss portions 42. The oil drainage ducts 56 are configured to fluid-communicatively connect the oil drainage groove 54 with the recessed pin boss portions 42. More specifically, the oil drainage ducts 56 are designed and configured to, upon actuation of the piston 16, guide oil received in the oil drainage groove 54 towards the recessed pin boss portions 42, i.e. the gap formed between the recessed pin boss portions 42 and the cylinder wall 40. In other words, the oil drainage ducts 56 are configured and design to drain oil from the oil drainage groove 54 into the crankcase of the engine 10 upon guiding the oil collected in the oil drainage groove 54 through the oil drainage ducts 56 and subsequently along the outer face 52 of the recessed pin boss portions 42 prior to being drained into the crank case.

By being provided with the oil drainage ducts 56, the proposed piston 16 may ensure that a flow cross-section of a flow path for draining oil collected ahead of the belt ring 26 into the crankcase is sufficiently high along the entire flow path so as to ensure proper removal of oil from the ring belt 24. In this way, the oil collected ahead of the ring belt 26 is prevented from being subjected to high flow resistance and thus to undue pressure which may cause oil slide into the combustion chamber 18.

In the two configurations of the piston 16 depicted in FIGS. 1 to 6, the piston 16 comprises two oil drainage ducts 56 arranged between the two recessed pin boss portions 42. Alternatively, the piston 16 may comprise more or less than two oil drainage ducts 56. Alternatively or additionally, the shown oil drainage ducts 56 may be separated such that each oil drainage duct 56 is split up into two distinct oil drainage ducts which may be spaced apart from one another along the circumferential direction of the piston 16.

As can be gathered from FIG. 2, the two oil drainage ducts 56 are arranged on opposed sides of the piston 16. Specifically, the two oil drainage ducts 56 are arranged opposed to one another with respect to both the longitudinal axis L and the pin bore axis P of the piston 16.

Each one of the oil drainage ducts 56 is formed by a recess provided in the outer surface of the piston skirt 24. In other words, the oil drainage ducts 56 are machined, particularly cut, into the outer surface of the piston skirt 24, particularly into the cylindrical portions 50 which are arranged adjacent to the recessed pin boss portions 42 of the piston skirt 24.

The oil drainage ducts 56 are designed such that a flow cross-section thereof tapers along a flow direction of oil in the oil drainage duct 56. In FIGS. 2 to 6, the flow direction of oil being guided through the oil drainage ducts 56 are indicated by an arrow A. As can be gathered from the indicated flow direction, the flow path of oil being guided through the oil drainage ducts 56 is smoothly deflected downwardly, i.e. in direction of the downward movement direction.

As to substance, in the proposed configuration of the piston 16, a flow direction of the oil to be drained along the outer surface of the piston skirt is smoothly deflected downwardly upon flowing through the oil drainage ducts 56. Specifically, by arranging the oil drainage duct 56 between the recessed pin boss portions 42, the oil drainage ducts 56 are provided with a certain length which may contribute to smoothly deflect the oil flow when passing the oil drainage duct 56, thereby improving the oil return flow, particularly when employing the piston 16 in a V-engine.

Specifically, for ensuring a proper length of the oil drainage ducts 56, the oil drainage ducts 56 extend along the entire circumferential length of the cylindrical portion 50 of the piston skirt 24.

In the following, the structural arrangement and characteristics of the oil drainage ducts 56 are further specified.

As depicted in FIGS. 2 to 4, each one of the oil drainage ducts 56 comprises a bottom edge 58 arranged at the outer surface of the piston skirt 24. The bottom edge 58 extends between the two recessed pin boss portions 42 such that its associated oil drainage duct 56 opens into the recessed pin boss portions 42. As can be gathered from FIG. 2, the bottom edge 58 is designed such that, in flow direction of the oil guided through the oil drainage duct 56, the bottom edge 58 is curved, i.e. smoothly curved, downwardly, i.e. in the downward movement direction.

Specifically, as can be gathered from FIGS. 3 and 4, the oil drainage duct 56 is designed such that, in the downward movement direction, i.e. being parallel to the longitudinal axis L of the piston 16 and directed towards the crank shaft 14, a middle section 60 of the bottom edge 58 is arranged prior to two opposing end sections 62 of the bottom edge 58.

In other words, when viewed in the downward movement direction, the middle section 60 is arranged before the two opposing end sections.

More specifically, as can be gathered from FIG. 2, each one of the oil drainage ducts 56 is designed such that, in the mounted state of the piston 16 in the engine 10, the middle section 60 of the bottom edge 58 is arranged prior to the two opposing end sections 62 of the bottom edge 58 when viewed in a downward direction along a vertical axis Z of the engine 10. In other words, the drainage ducts 56 are designed such that, in the mounted state of the piston 16 in the engine 10, the end sections 62 of the bottom edge 58 are arranged below the middle section 60 of the bottom edge 58. For illustrative purposes of this structural arrangement, a horizontal plane H is indicated by a dashed line in FIG. 2.

Alternatively, the oil drainage duct 56 may be designed such that the middle section 60 of the bottom edge 58 is arranged at the same level the two opposing end sections 62 of the bottom edge 58 when viewed in the downward direction along the vertical axis Z of the engine 10. Further, in the mounted state, each one of the oil drainage ducts 56 is designed such that the bottom edge 58 is curved downwardly relative to the horizontal plane H. Alternatively, the oil drainage ducts 56 may be designed such that the bottom edge 58 is arranged and extends in parallel to the horizontal plane H.

By being provided with the oil drainage ducts 56, the structural arrangement and mounting conditions of the pistons 16 in a V-engine are taken into account by the proposed piston configuration. Specifically, even though the piston 16 is arranged inclined relative to the vertical axis Z of the engine 10, i.e. due to the bank angle of the V engine, the proposed oil drainage ducts 56 may avoid that oil to be drained from the oil drainage groove 54 into the crank case is deflected upwardly, i.e. upwards against gravity, by the bottom edge 58 when being guided across the outer surface of the piston skirt 24.

As set forth above, in an alternative configuration, each one of the oil drainage ducts 56 may be separated or split up into two distinct oil drainage ducts. In such a configuration, the drainage duct may have a bottom edge having a first end section opening into the recessed pin boss portion 42 and a second end section opening into the oil drainage groove 54. In this configuration, the technical features, in particular as regards the structural arrangement, described in the present disclosure in connection with the middle section 60 may apply to and are thus disclosed also for the inner outer end. Accordingly, the technical features described above in connection with the end section 62 may apply to and are thus disclosed also for the second end section.

Furthermore, each one of the oil drainage ducts 56 comprises two opposing lateral edges 64 which, together with the bottom edge 58, delimit a flow path of the oil through the oil drainage duct 56. The lateral edges 64 are arranged at the outer surface of the piston skirt 24. Specifically, each one of the lateral edges 64 extends along the longitudinal axis L of the piston 16 between the oil drainage groove 54 and one of the recessed pin boss portions 42. In this way, the flow cross-section of the oil drainage duct 56 tappers in the flow direction A of oil through the oil drainage duct 56.

In the shown configuration, the bottom edge 58 has a parabolic shape. Alternatively, the bottom edge 58 may have a splint shape. To that end, the bottom edge 58 may entirely be arranged in a plane.

Specifically, the shape of the bottom edge 58 of the oil drainage duct 64 is parametrized by the following equations:

$$x = r \times \cos(t),$$
$$y = r \times \sin(t),$$
$$z = b + c \times (r \times -|\cos(t)^2|),$$
$$\text{for } \frac{2}{6}\pi \leq t \leq \frac{4}{6}\pi,$$

in which x represents a position along the pin boss axis P; y represents a position along a lateral axis being traverse to the pin box axis P; z represents a position along the central longitudinal axis L of the piston 16 being traverse to the pin box axis P and the lateral axis; r represents a radius of the outer circumferential surface of the piston skirt, i.e. the cylindrical portion 50, around the central longitudinal axis L of the piston 16; b is a parameter indicating the height position of the middle section 60 of the bottom edge 58 relative to the pin boss axis P; and c represents a coefficient.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A piston for an internal combustion engine, particularly a V-engine, may be provided which comprises an oil drainage groove provided in the outer circumferential surface of the piston between a ring belt and a piston skirt of the piston, the piston skirt being provided with two recessed pin boss portions on opposed sides of the piston, wherein the piston skirt is further provided with at least one oil drainage duct arranged between the two recessed pin boss portions at an outer surface of the piston skirt and configured to fluid-communicatively connect the oil drainage groove with the recessed pin boss portions.

In other words, with such a configuration, the proposed oil drainage duct is preferably configured to drain oil from the oil drainage groove into a crank case of the engine upon guiding oil through the oil drainage duct and subsequently along the outer face of the recessed pin boss portions when the piston is operated in the engine.

By being provided with the suggested oil drainage duct, proper return of oil from the ring belt into the crank case may be ensured. Specifically, the proposed configuration allows for providing the oil drainage duct with an adequate length so as to define a flow path for the oil which, upon flowing therethrough, may be subjected to a relatively low flow resistance, e.g. by reducing splashing of the oil or avoiding deflecting the oil upwards against gravity.

The proposed piston is intended and configured for being used in any suitable internal combustion engine, particularly reciprocating engine, which serve as main or auxiliary engines in vehicles, vessels or power plants. Specifically, the proposed piston may be used in V-engines, but is not limited to this application. Such engines may run on liquid fuels, such as diesel or gasoline, or gas fuels.

The proposed piston may be provided with a multi-part design, for example a two-part design, in which a piston head accommodating the ring belt and the piston skirt constitute distinct parts. Alternatively, the piston may be provided with an integral design in which the piston is cast of a single piece.

As set forth above, the piston skirt comprises the recessed pin boss portions which are arranged on opposed sides of the piston skirt. Accordingly, the recessed pin boss portions form a shell surface of the piston skirt. Further, the piston skirt comprises two opposing cylindrical portions, each of which is arranged adjacent to and in between the recessed pin boss portions. When comparing the recessed pin boss portions and the cylindrical portions of the piston skirt, a diameter of the piston, i.e. traverse to its longitudinal axis, extending between the recessed pin boss portions is lower compared to a diameter extending between the cylindrical portions. In this way, when being received in the cylinder of the engine, a gap is formed between the pin boss portions and a cylinder wall, into which the oil drainage duct opens and via which the oil flowing through the oil drainage duct is guided into the crank case of the engine.

Specifically, an outer face of the pin boss portions, which form an outer surface of the piston skirt, may have a planner shape. Alternatively or additionally, the outer face of the pin boss portions may be provided such that, in a radial direction of the piston, i.e. traverse to its longitudinal axis, it does not extend beyond a plane, i.e. which may be arranged in parallel to the longitudinal axis and which may be an imaginary plane. In such a configuration, the outer face may be provided with one or more recesses extending in a direction opposed to a radial direction of the piston.

The piston skirt may be provided with at least one oil drainage duct. In a further development, the piston skirt may be provided with at least two oil drainage ducts arranged between the two recessed pin boss portions at opposed sides of the piston.

Specifically, the at least one oil drainage duct may be formed by a recessed provided in the outer surface of the piston skirt. In other words, at least one oil drainage duct may be cut into the outer surface of the piston skirt.

In a further development, the oil drainage duct may be designed such that, when the piston is mounted and operated in the engine, a flow cross-section of the oil drainage duct tapers along a flow direction of oil in the oil drainage duct.

Further, the oil drainage duct may comprise a bottom edge arranged at the outer surface of the piston skirt and extending between the two recessed pin boss portions such that the oil drainage duct opens into at least one of the two recessed pin boss portions.

For example, the oil drainage duct may be designed such that, in a downward movement direction of the piston along a longitudinal axis of the piston, a middle section of the bottom edge is arranged prior to or on the same level as two opposing end sections of the bottom edge.

In a further development, in a mounted state of the piston in the engine, in particular in the V-engine, the oil drainage duct may be designed such that, in a downward direction along a vertical axis of the engine, the middle section of the bottom edge is arranged prior or on the same level as the two opposing end sections of the bottom edge.

Additionally or alternatively, in the mounted state of the piston in the engine, particularly in the V-engine, the oil drainage duct may be designed such that its bottom edge is curved downwardly or extends in parallel relative to a horizontal plane extending through the middle section of the bottom edge.

In a further development, the oil drainage duct may further comprise two opposing lateral edges arranged at the outer surface of the piston skirt, each of which extends along the longitudinal axis of the piston between the oil drainage groove and one of the recessed pin boss portions.

Additionally or alternatively, the bottom edge of the oil drainage duct may have a parabolic or splint shape.

Specifically, the shape of the bottom edge of the oil drainage duct may, at least partially, be parametrized by:

$$x = r \times \cos(t),$$
$$y = r \times \sin(t),$$
$$z = b + c \times (r \times -|\cos(t)^i|),$$
$$\text{for } \frac{2}{6}\pi \leq t \leq \frac{4}{6}\pi,$$

wherein x represents a position along a pin boss axis; y represents a position along a lateral axis being traverse to the pin box axis; z represents a position along a central longitudinal axis of the piston; r represents a radius of the outer circumferential surface of the piston skirt around the central longitudinal axis of the piston; b is a parameter indicating the height position of the middle section of the bottom edge relative to the pin boss axis; c represents a coefficient; and i represents an index provided as a natural number. Specifically, the index i may be 2, or any other suitable value, e.g. between 1 and 8, such as 3 or 4.

Furthermore, an internal combustion engine, particularly a V-engine, may be provided which comprises at least one piston as described above.

Since the proposed internal combustion engine is equipped with a piston as described above, technical features which are described in connection with the above piston may also relate and be applied to the proposed internal combustion engine, and vice versa.

INDUSTRIAL APPLICABILITY

With reference to the Figures and their accompanying description, a piston for an internal combustion engine and an internal combustion engine, in particular a V-engine, equipped with such a piston are suggested. The suggested piston may replace conventional pistons and may serve as a replacement or retrofit part.

The invention claimed is:

1. A piston for an internal combustion engine, comprising an oil drainage groove provided in an outer circumferential surface of the piston between a ring belt and a piston skirt of the piston, the piston skirt being provided with two recessed pin boss portions on opposed sides of the piston, wherein
   the piston skirt is further provided with at least one oil drainage duct arranged between the two recessed pin boss portions at an outer surface of the piston skirt and configured to fluid-communicatively connect the oil drainage groove with the recessed pin boss portions, the oil drainage duct having a flow cross-section that tapers along a flow direction of oil in the oil drainage duct.

2. The piston according to claim 1, having a multi-part design in which a piston head and the piston skirt constitute distinct parts.

3. The piston according to claim 1, wherein the recessed pin boss portions have a planar outer face forming an outer surface of the piston.

4. The piston according to claim 1, wherein the oil drainage duct is configured to drain oil from the oil drainage groove into a crank case of the engine upon guiding the oil through the oil drainage duct and subsequently along an outer face of the recessed pin boss portions when the piston is operated in the engine.

5. The piston according to claim 1, wherein the piston comprises at least two oil drainage ducts arranged between the two recessed pin boss portions at opposed sides of the piston.

6. The piston according to claim 1, wherein the oil drainage duct is formed by a recess provided in the outer surface of the piston skirt.

7. The piston according to claim 1, wherein the oil drainage duct comprises a bottom edge arranged at the outer surface of the piston skirt and extending between the two recessed pin boss portions such that the oil drainage duct opens into at least one of the two recessed pin boss portions.

8. The piston according to claim 7, wherein the oil drainage duct is designed such that, in a downward movement direction of the piston along a longitudinal axis of the piston, a middle section of the bottom edge is arranged prior to or on the same level as two opposing end sections of the bottom edge.

9. The piston according to claim 7, wherein the oil drainage duct is designed such that, when the piston is tilted about a pin bore axis between the two recessed pin boss portions, a middle section of the bottom edge is arranged above or on the same level in a vertical direction as opposing end sections of the bottom edge.

10. The piston according to claim 7, wherein the oil drainage duct is designed such that the bottom edge is curved downwardly or extends linearly downwardly, from a middle section to an end section.

11. The piston according to claim 1, wherein the oil drainage duct further comprises two opposing lateral edges arranged at the outer surface of the piston skirt, each of which extends along a longitudinal axis of the piston between the oil drainage groove and one of the recessed pin boss portions.

12. The piston according to claim 7 wherein the bottom edge of the oil drainage duct has a parabolic shape.

13. The piston according to claim 7, wherein a shape of the bottom edge of the oil drainage duct at least partially is parametrized by:

$$x = r \times \cos(t),$$
$$y = r \times \sin(t),$$
$$z = b + c \times (r \times - |\cos(t)^i|),$$
$$\text{for } \frac{2}{6}\pi \leq t \leq \frac{4}{6}\pi,$$

wherein x represents a position along a pin boss axis of the piston; y represents a position along a lateral axis being traverse to the pin box axis; z represents a position along a central longitudinal axis of the piston; r represents a radius of the outer surface of the piston skirt around the central longitudinal axis of the piston; b is a parameter indicating a height position of a middle section of the bottom edge relative to the pin boss axis; c represents a coefficient; and i represents an index provided as a natural number.

14. A internal combustion engine, comprising at least one piston according to claim 1.

* * * * *